Figure 1:
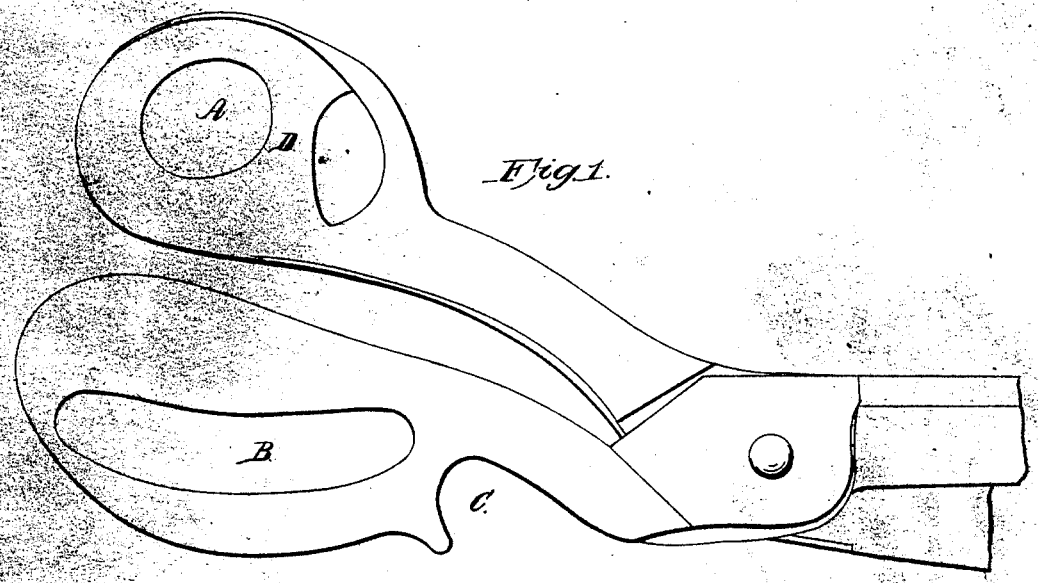
Figure 2:
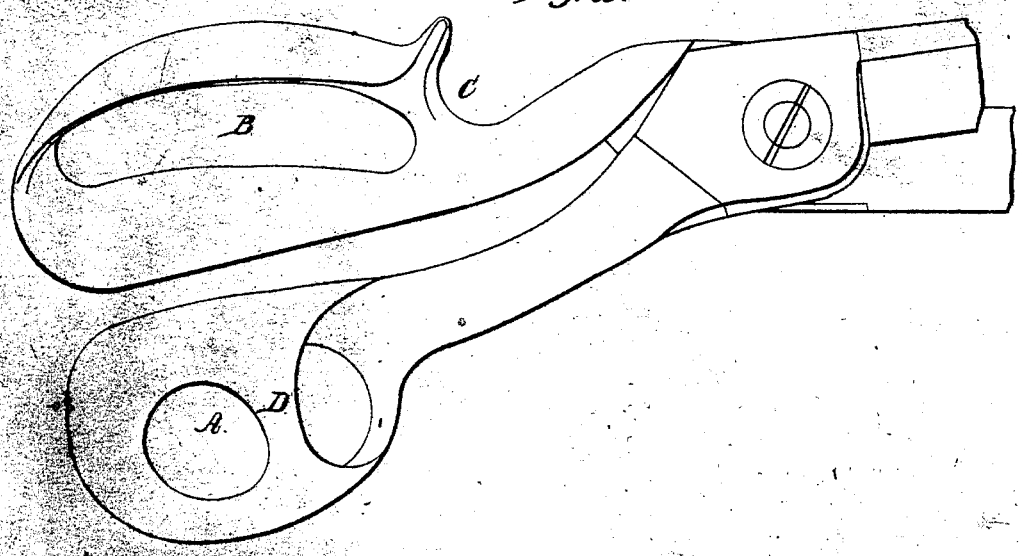

EXAMINERS ROOM.

No Spec Available.

H. Wendt,

Shears,

No 74, A1. Patented June 2, 1845.

Witnesses:

W. Merrill

Lemuel W. Serrell

Inventor:

Herman Wendt

A.H. PRETTS LITHO. 88 N.S. CHESNUT STREET PHILADA.